(12) United States Patent
Hung et al.

(10) Patent No.: US 8,888,380 B2
(45) Date of Patent: Nov. 18, 2014

(54) OPTOELECTRONIC ASSEMBLY AND ACTIVE OPTICAL CABLE USING SAME

(71) Applicant: SAE Magnetics (H.K.) Ltd., Hong Kong (HK)

(72) Inventors: Vincent Wai Hung, Hong Kong (HK); Margarito P. Banal, Jr., Hong Kong (HK); Amanda Tin Hoi Siu, Hong Kong (HK)

(73) Assignee: SAE Magnetics (H.K.) Ltd., Hong Kong (HK)

( * ) Notice: Subject to any disclaimer, the term of this patent is extended or adjusted under 35 U.S.C. 154(b) by 0 days.

(21) Appl. No.: 13/845,095

(22) Filed: Mar. 18, 2013

(65) Prior Publication Data

US 2013/0279860 A1    Oct. 24, 2013

Related U.S. Application Data

(60) Provisional application No. 61/637,338, filed on Apr. 24, 2012.

(51) Int. Cl.
*G02B 6/36* (2006.01)
*G02B 6/43* (2006.01)

(52) U.S. Cl.
CPC ............................... *G02B 6/43* (2013.01)
USPC ............................................ 385/89; 385/93

(58) Field of Classification Search
CPC ..................................................... G02B 6/43
USPC ........................................................ 385/88–93
See application file for complete search history.

(56) References Cited

U.S. PATENT DOCUMENTS

| 8,297,856 B2 * | 10/2012 | Banal et al. | 385/93 |
| 2008/0044141 A1 * | 2/2008 | Willis et al. | 385/88 |
| 2012/0219256 A1 * | 8/2012 | McColloch | 385/88 |

\* cited by examiner

*Primary Examiner* — Ellen Kim

(57) ABSTRACT

An optoelectronic assembly includes a substrate subassembly and a cable subassembly. The substrate assembly includes a substrate, a holder disposed on the substrate, an optoelectronic interface IC, and a plurality of optoelectronic components. The cable subassembly includes a lens cover and a plurality of fiber cables bonded to the lens cover. The optoelectronic interface IC and the optoelectronic components are disposed in a cavity formed by side walls of the holder. The optoelectronic components include at least one laser source and a plurality of photodiodes. The lens cover is inserted into the cavity and thereby fixedly engaged with the holder.

24 Claims, 10 Drawing Sheets

OPTOELECTRONIC ASSEMBLY AND ACTIVE OPTICAL CABLE USING SAME

CROSS-REFERENCE TO RELATED APPLICATIONS

This application claims the benefit of U.S. Provisional Patent Application No. 61/637,338 filed on Apr. 24, 2012, the contents of which is hereby incorporated by reference.

FIELD OF THE PATENT APPLICATION

The present patent application generally relates to opto-electrical interconnect technologies and more specifically to a fiber-attached optoelectronic assembly optimized for active optical cable applications and an active optical cable using the optoelectronic assembly.

BACKGROUND

The bandwidth requirement for consumer electronics and personal computing data buses has been rapidly increasing due to the increase in storage capacity and display resolution. At the same time, the latency for data buses is expected to decrease. As a result, the bit rate for data buses employed in these applications has increased significantly in recent years. Copper cables conventionally used for data transmission can no longer meet the increasing trend of the bandwidth requirement. To meet the bandwidth requirement, optical fibers are used for data transmission. An active optical cable makes use of an embedded optical transceiver and an optical fiber to facilitate high-speed data transmission while still providing electrical interfaces compatible with conventional connectors. Compared with copper cables, active optical cables usually have bulkier cable plugs due to the need to accommodate additional opto-mechanical plug structures for optical coupling.

SUMMARY

The present patent application is directed to an optoelectronic assembly. In one aspect, the optoelectronic assembly includes a substrate subassembly and a cable subassembly. The substrate assembly includes a substrate, a holder disposed on the substrate, an optoelectronic interface IC, and a plurality of optoelectronic components. The cable subassembly includes a lens cover and a plurality of fiber cables bonded to the lens cover. The optoelectronic interface IC and the optoelectronic components are disposed in a cavity formed by side walls of the holder. The optoelectronic components include at least one laser source and a plurality of photodiodes. The lens cover is inserted into the cavity and thereby fixedly engaged with the holder.

The optoelectronic interface IC may be configured to facilitate the conversion of optical signals to digital electrical signals. The holder may further include a plurality of alignment features and snap features configured to facilitate the engagement of the substrate subassembly and the cable subassembly.

The at least one laser source and the photodiodes may be in a singlet form or an array form. A front side of the holder may include a fiber cable holding area configured for supporting the fiber cables. The cable subassembly may further include a fiber cover covering the fiber cables. The lens cover may be fabricated using a moldable optical material capable of providing an optical pathway between the fiber cables and the optoelectronic components.

A top side of the lens cover may include a fiber attachment area accommodating a plurality of fiber alignment structures for precision alignment of a plurality of bare fibers and a cable landing area for bonding the fiber cables onto the lens cover, the bare fibers being a part of the fiber cables. The top side of the lens cover may further include a plurality of structures configured for engaging with the snap features of the holder. A bottom side of the lens cover may include a plurality of optical lens structures, a plurality of alignment pins and a plurality of support pins, the number of the optical lens structures matching with the number of the fiber alignment structures. The alignment pins may be inserted into the alignment features and the support pins may be disposed at four corners of the cavity.

Top inner sides of the side walls of the holder may include a plurality of chamfer features, and the top side of the lens cover may further include a plurality of second chamfer structures, the chamfer features of the holder and the chamfer structures of the lens cover forming a valley structure around the interface between the lens cover and the holder. Adhesive may be dispensed into the valley structure to seal up any air gaps between the lens cover and the holder. The side walls of the holder may include a step inside the cavity, the step being configured to prevent the adhesive from flowing to a surface of the substrate.

The lens cover may further include a beam steering structure located directly above the optical lens structures and configured to direct optical beams to allow the coupling of optical signals between the optical lens structures and the fiber cables.

In another aspect, the present patent application provides a cable plug being connected to an electrical connector. The cable plug includes: a cable controller being connected to the electrical connector; a signal conditioner being connected to the cable controller and the electrical connector; and an optoelectronic assembly being connected to the cable controller and the signal conditioner. The optoelectronic assembly includes a substrate subassembly and a cable subassembly. The substrate assembly includes a substrate, a holder disposed on the substrate, an optoelectronic interface IC, and a plurality of optoelectronic components. The cable subassembly includes a lens cover, a plurality of fiber cables bonded to the lens cover, and a fiber cover covering the fiber cables. The optoelectronic interface IC and the optoelectronic components are disposed in a cavity formed by side walls of the holder. The optoelectronic components include at least one laser source and a plurality of photodiodes. The lens cover is inserted into the cavity and thereby fixedly engaged with the holder.

The signal conditioner may be configured to provide a high-speed signal interface for communicating with an external system through the electrical connector with at least one transmitting channel and one receiving channel both operating at a data rate of at least 10 gigabits per second.

The cable controller may be configured to manage the operation of the signal conditioner and the optoelectronic interface IC in accordance with a protocol stored within an internal memory of the cable controller.

In yet another aspect, the present patent application provides an active optical cable including: a first electrical connector; a second electrical connector; a first cable plug connected with the first electrical connector; a second cable plug connected with the second electrical connector; and an optical cable with a first end and a second end, the first end and the second end of the optical cable being connected with the first cable plug and the second cable plug respectively. Each of the first and the second cable plugs includes: a cable controller being connected to the electrical connector that connects to the cable plug; a signal conditioner being connected to the cable controller and the electrical connector; and an optoelectronic assembly being connected to the cable controller and the signal conditioner. The optoelectronic assembly includes an optoelectronic interface IC, at least one optical transmitter, at least one optical receiver, and a plurality of bonded fiber cables running through the optical cable, being connected to the other cable plug, and thereby forming an optical pathway.

The electrical connector may be a Thunderbolt connector. The active optical cable may further include two metal covers covering the electrical connector and the optoelectronic assembly respectively, and an outer sleeve enclosing the optoelectronic assembly.

BRIEF DESCRIPTIONS OF THE DRAWINGS

FIG. 14 (*b*) is an internal schematic diagram of a cable plug included in the AOC depicted in FIG. 14 (*a*).

FIG. 15 (*b*) is a perspective view of the AOC cable plug as depicted in FIG. 15 (*a*).

DETAILED DESCRIPTION

Reference will now be made in detail to a preferred embodiment of the optoelectronic assembly and the active optical cable using the same disclosed in the present patent application, examples of which are also provided in the following description. Exemplary embodiments of the optoelectronic assembly and the active optical cable using the same disclosed in the present patent application are described in detail, although it will be apparent to those skilled in the relevant art that some features that are not particularly important to an understanding of the optoelectronic assembly and the active optical cable using the same may not be shown for the sake of clarity.

Furthermore, it should be understood that the optoelectronic assembly and the active optical cable using the same disclosed in the present patent application is not limited to the precise embodiments described below and that various changes and modifications thereof may be effected by one skilled in the art without departing from the spirit or scope of the protection. For example, elements and/or features of different illustrative embodiments may be combined with each other and/or substituted for each other within the scope of this disclosure.

Figure 1:
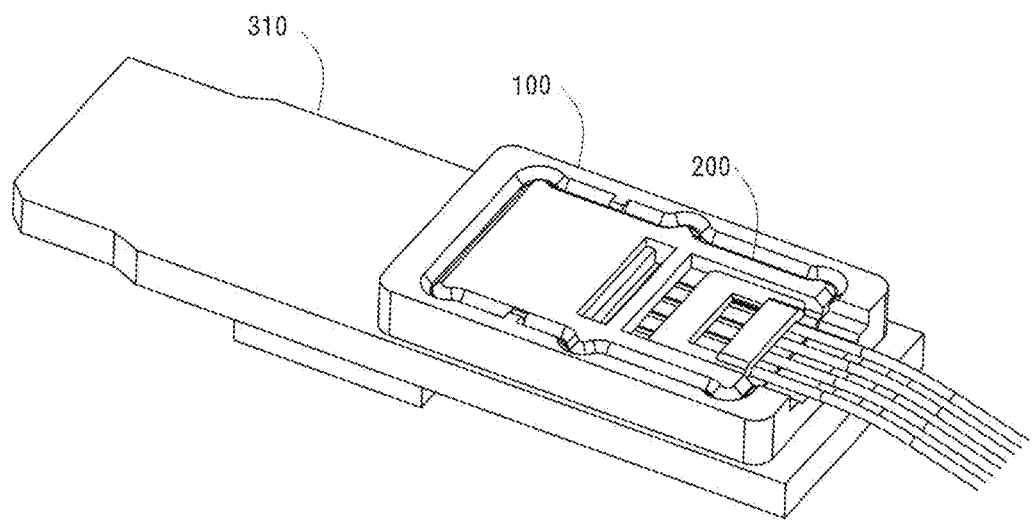
FIG. 1 is a perspective view of a fiber-attached optoelectronic assembly according to an embodiment of the present patent application.
Figure 2:
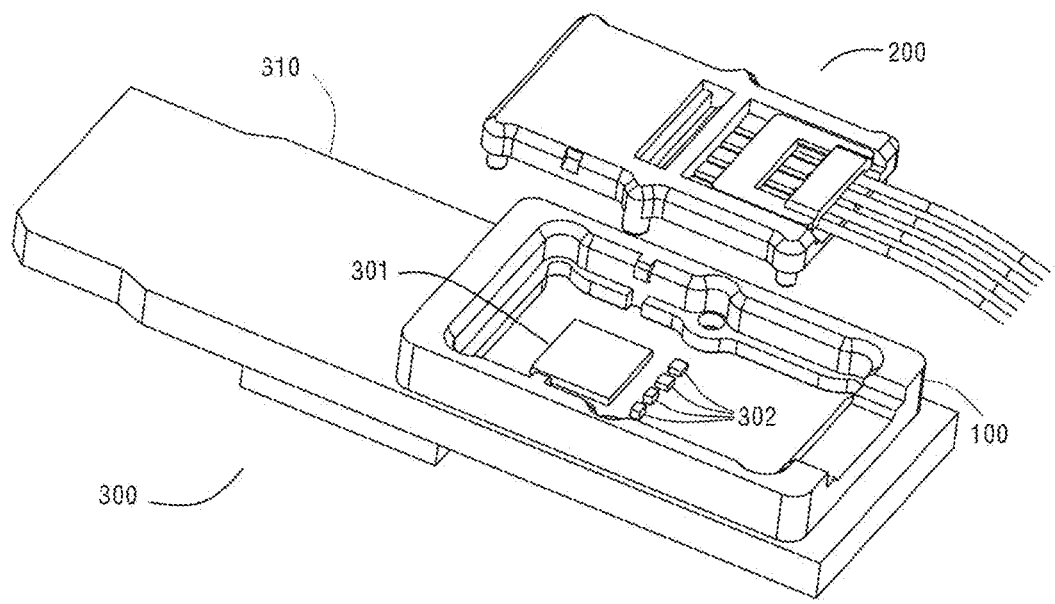
FIG. 2 is an exploded view of the fiber-attached optoelectronic assembly depicted in FIG. 1.

FIG. 1 is a perspective view of a fiber-attached optoelectronic assembly according to an embodiment of the present patent application. FIG. 2 is an exploded view of the fiber-attached optoelectronic assembly depicted in FIG. 1. Referring to FIG. 1 and FIG. 2, the optoelectronic assembly includes a substrate subassembly 300 and a cable subassembly 200. The substrate subassembly 300 and the cable subassembly 200 are snapped together to form the final optoelectronic assembly. As illustrated in FIG. 2, the substrate subassembly 300 includes a substrate 310, a holder 100 disposed on the substrate 310, an optoelectronic interface IC 301 and a plurality of optoelectronic components 302. The optoelectronic interface IC 301 and the optoelectronic components 302 are accommodated in the holder 100. The optoelectronic components 302 may include at least one laser source and multiple photodiodes, and can be in either a singlet form or an array form. The optoelectronic interface IC 301 is electrically connected to the optoelectronic components 302 and any other electronic components that may be on the substrate 310. The optoelectronic interface IC 301 is configured to facilitate the conversion of optical signals to digital electrical signals.

Figure 3:
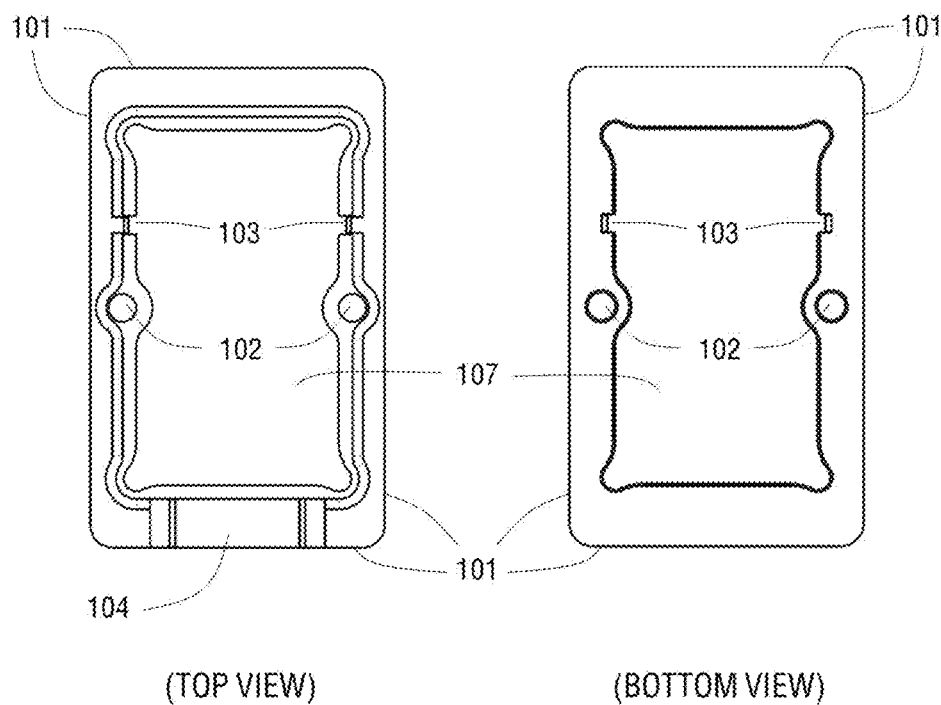
FIG. 3 shows a top and a bottom view of a holder in the fiber-attached optoelectronic assembly depicted in FIG. 1.
Figure 4:
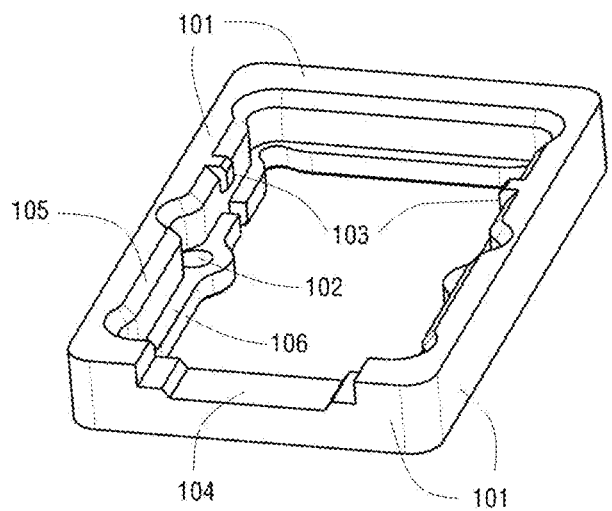
FIG. 4 is a perspective view of the holder depicted in FIG. 3.

FIG. 3 shows a top view and a bottom view of the holder in the fiber-attached optoelectronic assembly depicted in FIG. 1. FIG. 4 is a perspective view of the holder depicted in FIG. 3. As illustrated in FIG. 3 and FIG. 4, both the optoelectronic interface IC 301 and the optoelectronic components 302 are located within the confinement of a cavity 107 formed by side walls 101 of the holder 100. The holder 100 further includes a plurality of alignment features 102 and snap features 103 configured to facilitate the engagement of the substrate subassembly 300 and the cable subassembly 200. Referring to FIG. 4, the top inner sides of the side walls 101 have multiple chamfer features 105. The front side of the holder 100 is marked by the presence of a fiber cable holding area 104.

Figure 5:
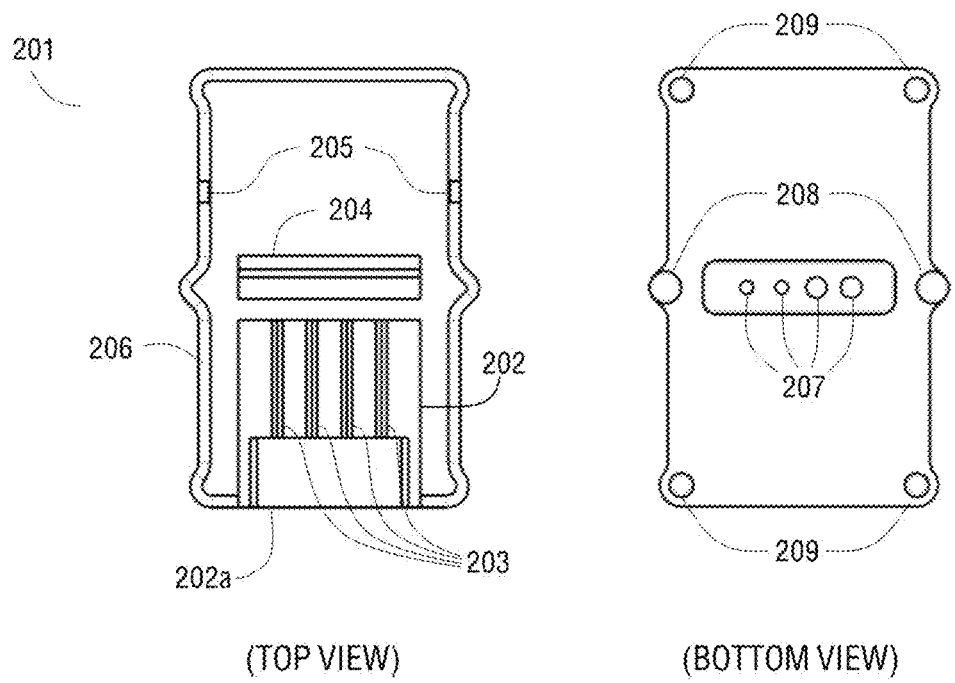
FIG. 5 shows a top view and a bottom view of a lens cover of in the fiber-attached optoelectronic assembly depicted in FIG. 1.
Figure 6:
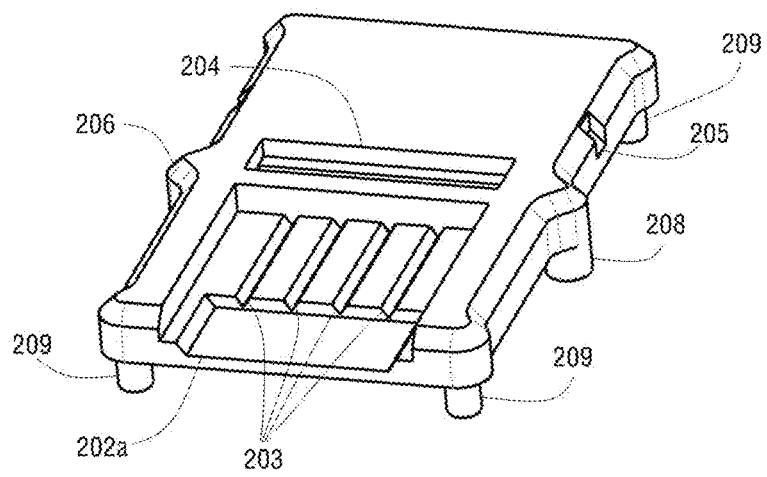
FIG. 6 is a perspective view of the lens cover depicted in FIG. 5.
Figure 7:
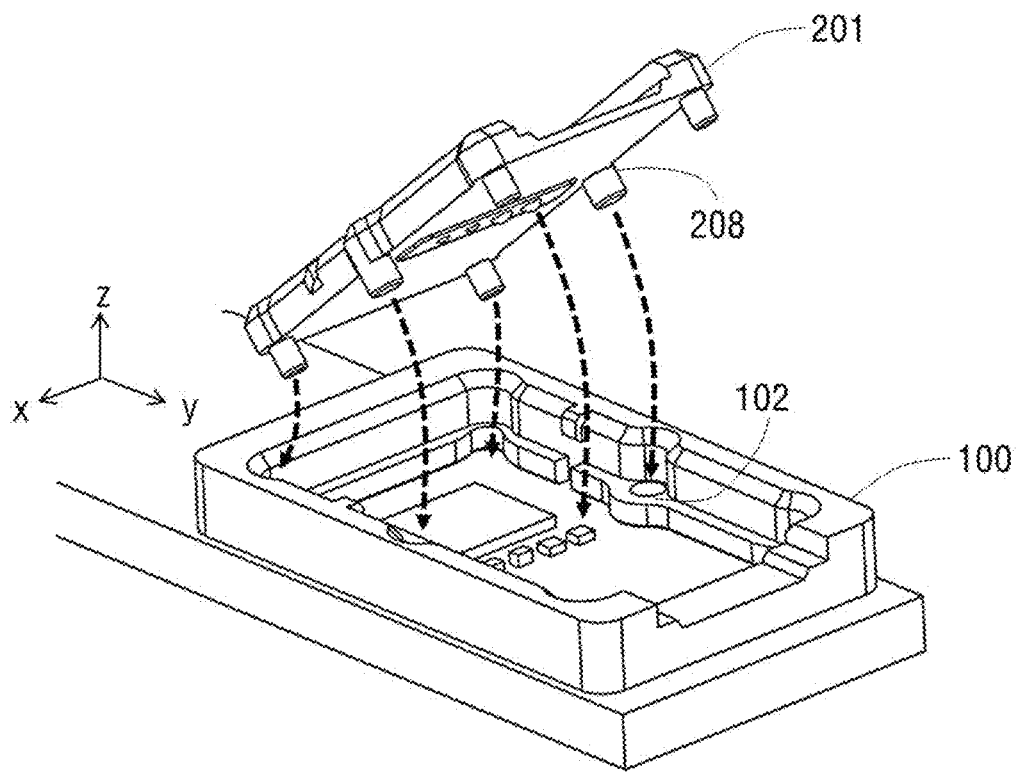
FIG. 7 illustrates the lens cover depicted in FIG. 5 being assembled into the holder (the fiber and the fiber cover not shown).
Figure 8:
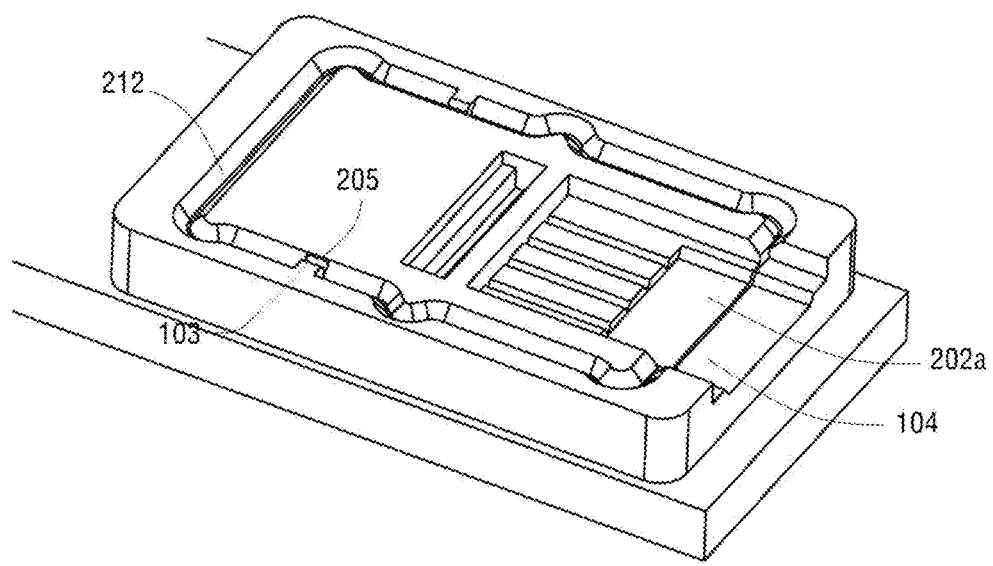
FIG. 8 illustrates the lens cover depicted in FIG. 5 fully assembled into the holder (the fiber and the fiber cover not shown).
Figure 9:
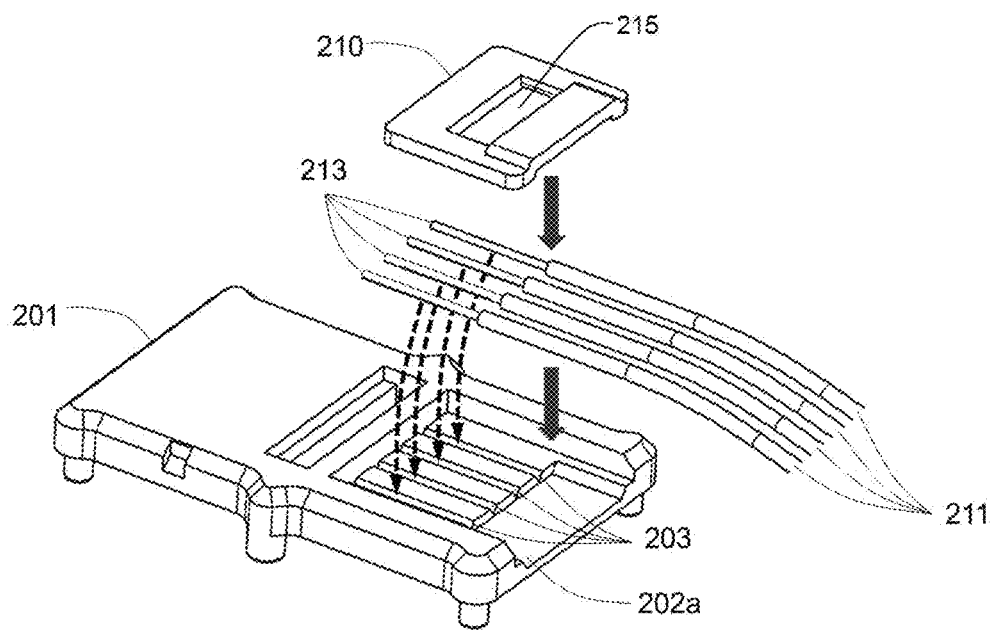
FIG. 9 illustrates the assembly of a fiber attachment assembly in the fiber-attached optoelectronic assembly depicted in FIG. 1.

As illustrated in FIGS. 5-9, the cable subassembly 200, which may also be referred to as the fiber attachment subassembly 200, includes a lens cover 201, multiple fiber cables 211 and a fiber cover 210. As illustrated in FIG. 9, the fiber cover 210 is disposed above and thereby covering the fiber cables 211. The structure of the lens cover 201 is illustrated in FIG. 5 and FIG. 6. The lens cover 201 is fabricated using a moldable optical material capable of providing an optical pathway between the fiber cables 211 and the optoelectronic components 302. Referring to FIG. 5, the top side of the lens cover 201 includes a fiber attachment area 202. This area accommodates a plurality of fiber alignment structures 203 for the precision alignment of bare fibers 213 (being a part of the fiber cables 211 as shown in FIG. 9) and a cable landing area 202a for bonding the fiber cables 211 onto the lens cover 201. The bottom side of the lens cover 201 includes a plurality of optical lens structures 207, a plurality of alignment pins 208 and a plurality of support pins 209. The number of the optical lens structures 207 matches with the number of the fiber alignment structures 203. A beam steering structure 204 is located directly above the optical lens structures 207, and configured to direct optical beams travelling in a horizontal direction to a vertical direction and vice versa to allow the coupling of optical signals between the vertically positioned optical lens structures 207 and the horizontally positioned fiber cables 211. The top side of the lens cover 201 further includes a plurality of structures 205 for engaging with the multiple snap features 103 on the holder 100 as illustrated in FIG. 3 and FIG. 4. Multiple chamfer structures 206 are also located around the top side of the lens cover 201.

FIG. 7 illustrates the lens cover 201 depicted in FIG. 5 being assembled into the holder 100. FIG. 8 illustrates the lens cover 201 fully assembled into the holder 100. FIG. 9 illustrates the assembly of a fiber attachment assembly in the fiber-attached optoelectronic assembly depicted in FIG. 1. In FIG. 7 and FIG. 8, the fiber cables 211 and the fiber cover 210 as illustrated in FIG. 9 are not shown. Referring to FIG. 7 and FIG. 8, in the assembly process, the lens cover 201 of the fiber attachment subassembly 200 is inserted into the cavity 107 (illustrated in FIG. 3) of the holder 100 of the substrate subassembly 300. In the process of this insertion, the alignment pins 208 are inserted into the alignment features 102 and the support pins 209 are located into the four corners of the cavity 107. Since the alignment pins 208 and the alignment features 102 are reference points for the molding of the lens structures 207 and the bonding of the optoelectronic components 302 respectively, the mating of these two reference structures ensures high alignment accuracy between the lens structures 207 and the optoelectronic components 302 in the x and the y directions. In the z direction, the lens structures 207 need to stop at desired distances from the optoelectronic components 302. This is guaranteed by the height of the support pins 209, which are in direct contact with the top surface of the substrate subassembly 300 after the insertion. Once the lens cover 201 is fully inserted into the cavity 107, the snap features 103 latch with the structures 205, and hold the lens cover 201 in place for later processes. The fiber cables 211 (not shown in FIG. 7 and FIG. 8) attached to the lens cover 201 are supported by the fiber cable holding area 104. The chamfer features 105 at the holder side (as shown in FIG. 4) and the chamfer structures 206 at the lens cover side (as shown in FIGS. 5-6) form a valley structure 212 around the interface between the lens cover 201 and the holder 100. Adhesive is dispensed into the valley structure 212 to seal up any air gaps between the lens cover 201 and the holder 100. A step 106 (as shown in FIG. 4) on the side walls of the holder 100 inside the cavity 107 is configured to prevent the sealing adhesive from flowing to the surface of the substrate 310. Additional adhesive can be applied to the fiber cable holding area 104 to attach the fiber cables 211 to the holder 100 for strengthening the mechanical support for the fiber cables 211.

Figure 10:
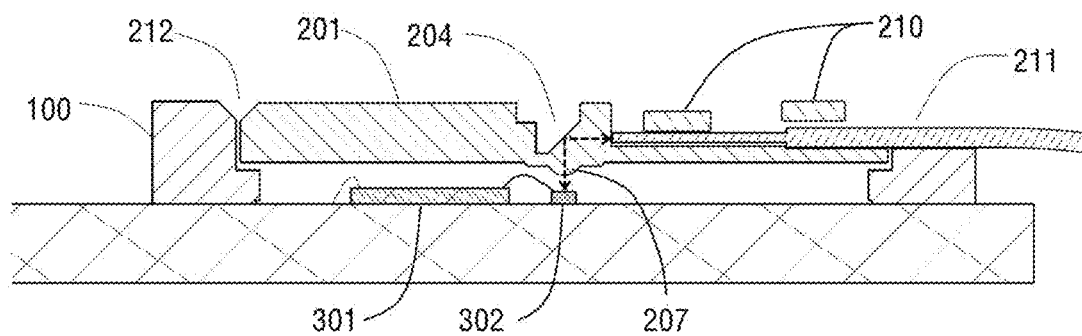
FIG. 10 is a cross-sectional view of the fiber-attached optoelectronic assembly depicted in FIG. 1 being completely assembled.
Figure 11:
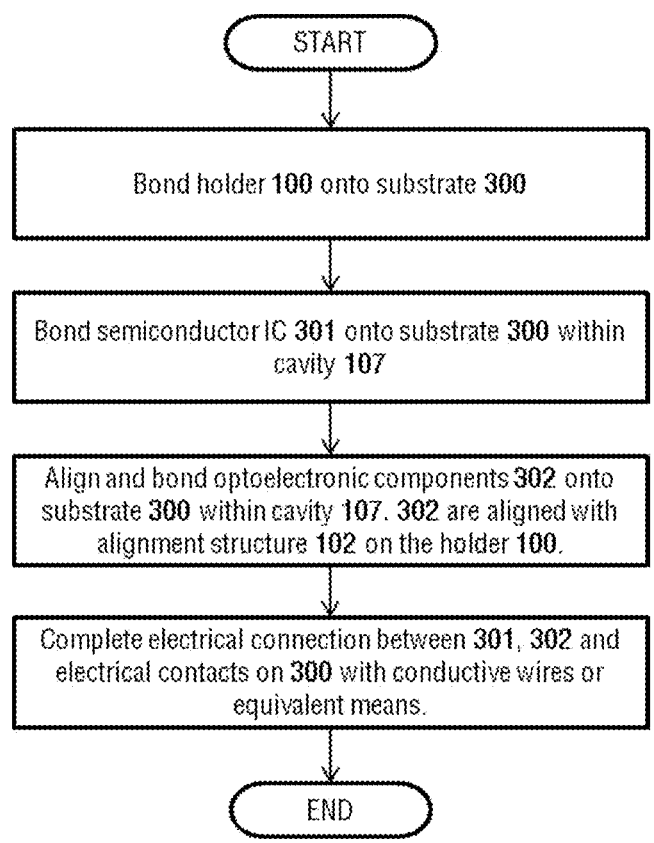
FIG. 11 is a flowchart illustrating a process for assembling a substrate subassembly in the fiber-attached optoelectronic assembly depicted in FIG. 1.
Figure 12:
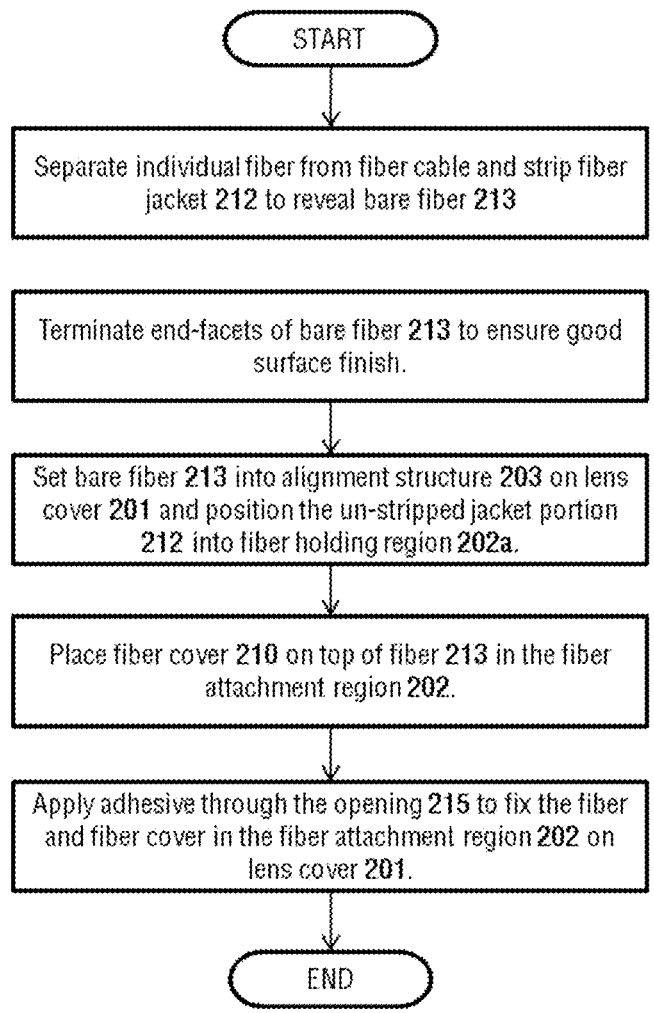
FIG. 12 is a flowchart illustrating a process for assembling a cable subassembly in the fiber-attached optoelectronic assembly depicted in FIG. 1.
Figure 13:
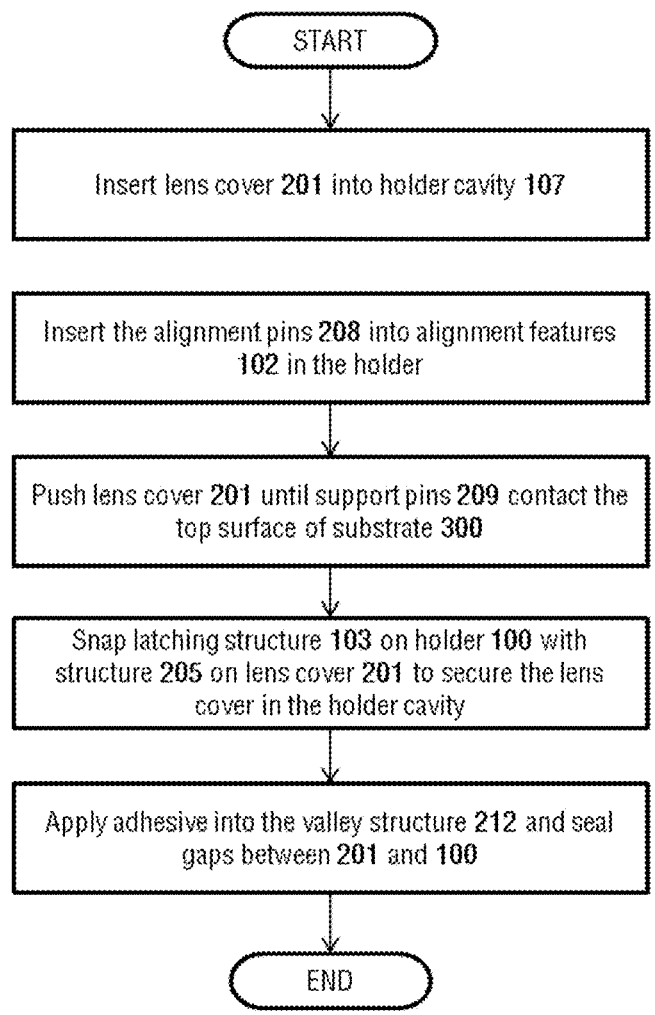
FIG. 13 is a flowchart illustrating a process for assembling the fiber-attached optoelectronic assembly depicted in FIG. 1 using the cable subassembly assembled as in FIG. 12 and the substrate subassembly assembled as in FIG. 11.

FIG. 10 is a cross-sectional view of the fiber-attached optoelectronic assembly depicted in FIG. 1 being completely assembled. FIG. 11 is a flowchart illustrating a process for assembling a substrate subassembly in the fiber-attached optoelectronic assembly depicted in FIG. 1. FIG. 12 is a flowchart illustrating a process for assembling a cable subassembly in the fiber-attached optoelectronic assembly depicted in FIG. 1. FIG. 13 is a flowchart illustrating a process for assembling the fiber-attached optoelectronic assembly depicted in FIG. 1 using the cable subassembly assembled as in FIG. 12 and the substrate subassembly assembled as in FIG. 11.

Figure 14:
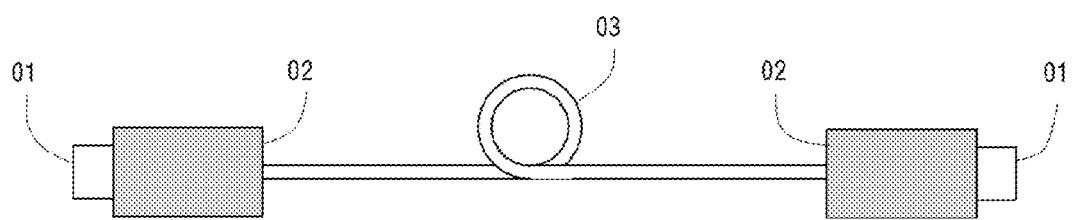
FIG. 14 (*a*) is an active optical cable (AOC) that includes a fiber-attached optoelectronic assembly as depicted in FIG. 1 according to another embodiment of the present patent application.
Figure 14:
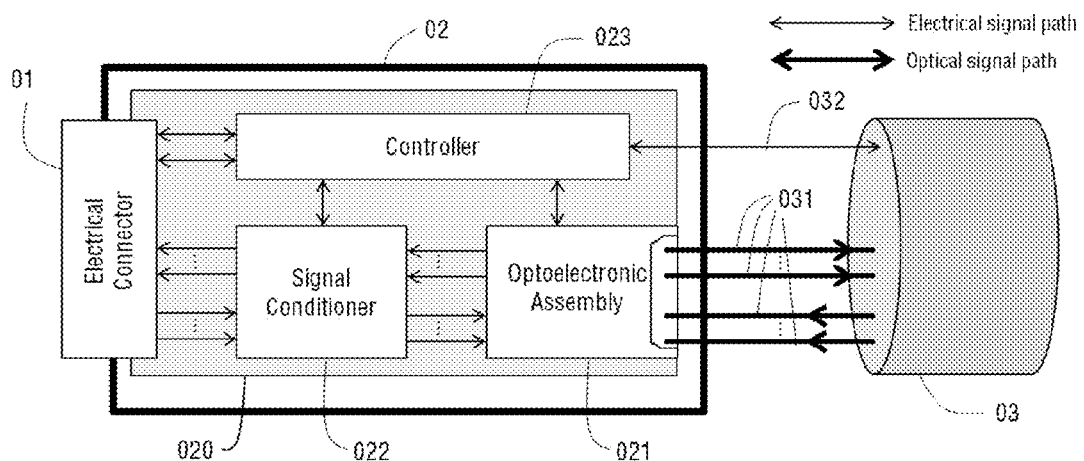

FIG. 14 (a) is an active optical cable (AOC) that includes a fiber-attached optoelectronic assembly as depicted in FIG. 1 according to another embodiment of the present patent application. Referring to FIG. 14 (a), the AOC includes an optical cable 03 with two ends, and an electrical connector 01 and a cable plug 02 being connected to each end of the optical cable 03. FIG. 14 (b) is an internal schematic diagram of the cable plug 02 included in the AOC depicted in FIG. 14 (a). Referring to FIG. 14 (b), the cable plug 02 includes a cable controller 023, a signal conditioning IC (signal conditioner) 022, and a fiber-attached optoelectronic assembly 021 as in aforementioned embodiments. The electrical connector 01 is electrically connected to the cable controller 023 and the signal conditioning IC 022 which, in turn, is connected to the fiber-attached optoelectronic assembly 021. The signal conditioning IC 022 is configured to provide a high-speed signal interface for communicating with an external system through the electrical connector 01 with at least one transmitting channel and one receiving channel both operating at a data rate of at least 10 gigabits per second. The signal conditioning IC 022 provides an equalization function to compensate signal distortions due to the transmission and the connectors. The signal conditioning IC 022 also provides clock recovery and data regeneration to further enhance the signal quality for both transmission directions. The optoelectronic assembly 021 includes an optoelectronic interface IC (301 illustrated in FIG. 2); at least one optical transmitter that includes at least a laser source; and at least one optical receiver that includes at a plurality of photodiodes. The fiber cables (211 illustrated in FIG. 9) being directly attached (bonded) to the optoelectronic assembly 021 as described in the aforementioned embodiments run through the optical cable 03 and are connected to the cable plug 02 at the other end of the optical cable 03, forming an optical pathway 031. It is understood that the fiber cables can be regarded as a component of the optoelectronic assembly 021 as well. The cable controller 023 is connected to an external system through low-speed control signaling lines via the electrical connector 01. The cable controller 023 is connected to the signal conditioning IC 022 and the optoelectronic interface IC 301 inside the optoelectronic assembly 021 via respective control management interfaces. The cable controller 023 is configured to manage the operation of both ICs in accordance with a protocol stored within the cable controller's internal memory. The controller 023 can also operate in accordance with controlling signals from an external system and provide diagnostic information to the external system. There may be an optional electrical pathway 032 embedded through the optical cable 03 that connects the cable controllers 023 in the cable plugs 02 at both ends of the optical cable 03.

Figure 15:
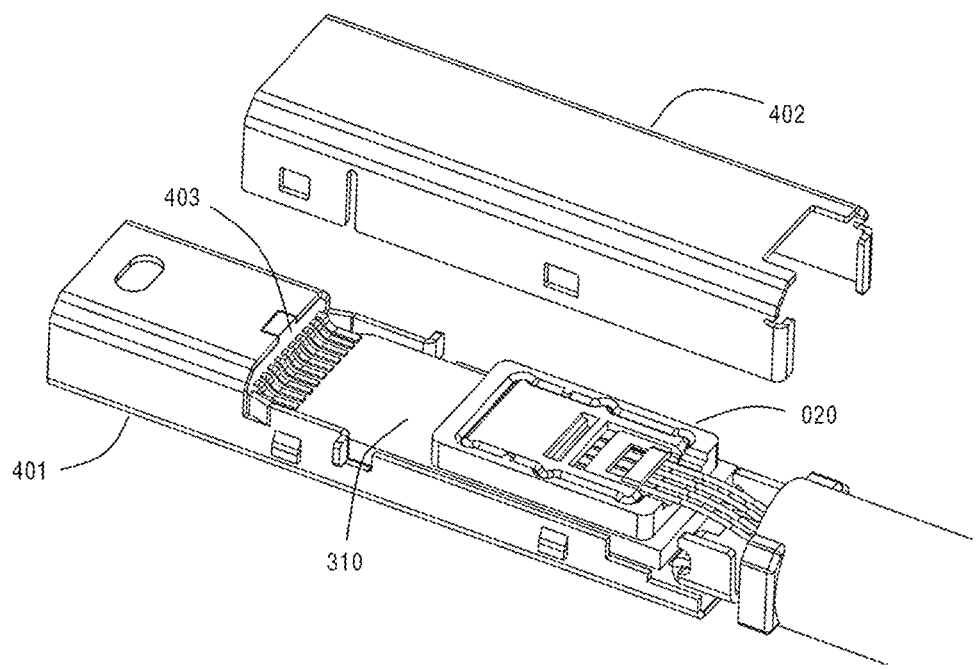
FIG. 15 (*a*) shows the internal structure of an AOC cable plug compatible with Thunderbolt in accordance with the embodiment depicted in FIG. 14 (*a*).
Figure 15:
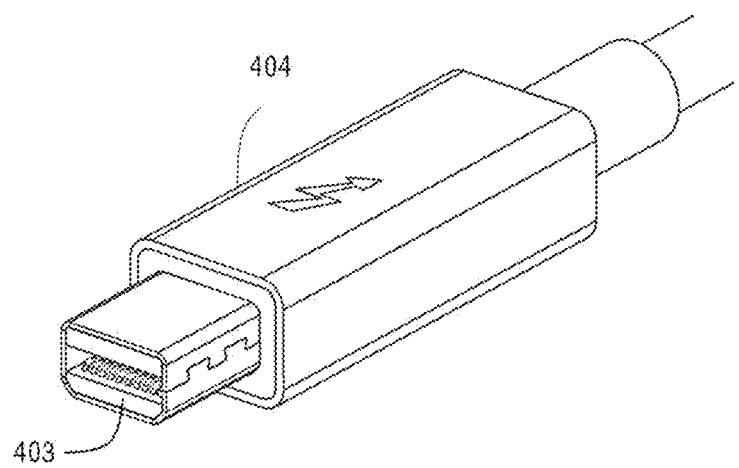

FIG. 15 (a) shows the internal structure of an AOC cable plug compatible with Thunderbolt in accordance with the embodiment depicted in FIG. 14 (a). FIG. 15 (b) is a perspective view of the AOC cable plug as depicted in FIG. 15 (a). Referring to FIG. 15 (a) and FIG. 15 (b), a Thunderbolt connector 403, which corresponds to the electrical connector 01 shown in FIG. 14 (b), is directly connected to the circuit substrate 310 of the fiber-attached optoelectronic assembly 020. Both the signal conditioner and the cable controller IC (not shown) are populated on the same circuit substrate 310. The Thunderbolt connector 403 and the optoelectronic assembly 020 are enclosed in metal covers 401 and 402. An additional outer sleeve 404 encloses the optoelectronic assembly 020 so as to form the cable plug.

The above-mentioned embodiments provide a miniature fiber-attached optoelectronic assembly optimized for use in active optical cable applications. The optoelectronic assembly design has advantages over conventional bulkier optomechanical plug systems by allowing fibers to be directly attached to the optical assembly while still facilitating good manufacturability.

While the present patent application has been shown and described with particular references to a number of embodiments thereof, it should be noted that various other changes or modifications may be made without departing from the scope of the present invention.

What is claimed is:

1. An optoelectronic assembly comprising:
    a substrate subassembly, the substrate assembly comprising a substrate, a holder disposed on the substrate, an optoelectronic interface IC, and a plurality of optoelectronic components; and
    a cable subassembly, the cable subassembly comprising a lens cover and a plurality of fiber cables bonded to the lens cover; wherein:
    the optoelectronic interface IC and the optoelectronic components are disposed in a cavity formed by side walls of the holder;
    the optoelectronic components comprise at least one laser source and a plurality of photodiodes; and
    the lens cover is inserted into the cavity and thereby fixedly engaged with the holder;
    wherein the holder further comprises a plurality of alignment features, a bottom of the cavity comprises a plurality of recessed corners; a bottom side of the lens cover comprises a plurality of alignment pins and a plurality of support pins, the alignment pins are inserted into the alignment features.

2. The optoelectronic assembly of claim 1, wherein the optoelectronic interface IC is configured to facilitate the conversion of optical signals to digital electrical signals.

3. The optoelectronic assembly of claim 1, wherein the holder further comprises a plurality of snap features at top of edges of the cavity; top sides of the lens cover further comprises a plurality of latch structures configured for engaging with the snap features of the holder; the snap features and latch structures are configured to facilitate the engagement of the substrate subassembly and the cable subassembly.

4. The optoelectronic assembly of claim 1, wherein the at least one laser source and the photodiodes are in a singlet form or an array form.

5. The optoelectronic assembly of claim 1, wherein a front side of the holder comprises a fiber cable holding area configured for supporting the fiber cables, and the cable subassembly further comprises a fiber cover covering the fiber cables.

6. The optoelectronic assembly of claim 1, wherein the lens cover is fabricated using a moldable optical material capable of providing an optical pathway between the fiber cables and the optoelectronic components.

7. The optoelectronic assembly of claim 3, wherein a top side of the lens cover comprises a fiber attachment area accommodating a plurality of fiber alignment structures for precision alignment of a plurality of bare fibers and a cable landing area for bonding the fiber cables onto the lens cover, the bare fibers being a part of the fiber cables.

8. The optoelectronic assembly of claim 7, wherein a bottom side of the lens cover comprises a plurality of optical lens structures, the number of the optical lens structures matching with the number of the fiber alignment structures.

9. The optoelectronic assembly of claim 7, wherein top inner sides of the side walls of the holder comprise a plurality of chamfer features, and the top side of the lens cover further comprises a plurality of second chamfer structures, the chamfer features of the holder and the chamfer structures of the lens cover forming a valley structure around the interface between the lens cover and the holder.

10. The optoelectronic assembly of claim 9, wherein adhesive is dispensed into the valley structure to seal up any air gaps between the lens cover and the holder.

11. The optoelectronic assembly of claim 10, wherein the side walls of the holder comprise a step inside the cavity, the step being configured to prevent the adhesive from flowing to a surface of the substrate.

12. The optoelectronic assembly of claim 8, wherein the lens cover further comprises a beam steering structure located directly above the optical lens structures and configured to direct optical beams to allow the coupling of optical signals between the optical lens structures and the fiber cables.

13. A cable plug being connected to an electrical connector, the cable plug comprising:
    a cable controller being connected to the electrical connector;
    a signal conditioner being connected to the cable controller and the electrical connector; and
    an optoelectronic assembly being connected to the cable controller and the signal conditioner, the optoelectronic assembly comprising:
    a substrate subassembly, the substrate assembly comprising a substrate, a holder disposed on the substrate, an optoelectronic interface IC, and a plurality of optoelectronic components; and
    a cable subassembly, the cable subassembly comprising a lens cover, a plurality of fiber cables bonded to the lens cover, and a fiber cover covering the fiber cables; wherein:
    the optoelectronic interface IC and the optoelectronic components are disposed in a cavity formed by side walls of the holder;
    the optoelectronic components comprise at least one laser source and a plurality of photodiodes; and
    the lens cover is inserted into the cavity and thereby fixedly engaged with the holder; wherein the holder further comprises a plurality of alignment features, a bottom of the cavity comprises a plurality of recessed corners; a bottom side of the lens cover comprises a plurality of alignment pins and a plurality of support pins, the alignment pins are inserted into the alignment features.

14. The cable plug of claim 13, wherein the signal conditioner is configured to provide a high-speed signal interface for communicating with an external system through the electrical connector with at least one transmitting channel and one receiving channel both operating at a data rate of at least 10 gigabits per second.

15. The cable plug of claim 13, wherein the cable controller is configured to manage the operation of the signal conditioner and the optoelectronic interface IC in accordance with a protocol stored within an internal memory of the cable controller.

16. An active optical cable comprising:
    a first electrical connector;
    a second electrical connector;
    a first cable plug connected with the first electrical connector;

a second cable plug connected with the second electrical connector; and an optical cable with a first end and a second end, the first end and the second end of the optical cable being connected with the first cable plug and the second cable plug respectively; wherein each of the first and the second cable plugs comprises:

a cable controller being connected to the electrical connector that connects to the cable plug; a signal conditioner being connected to the cable controller and the electrical connector; and an optoelectronic assembly being connected to the cable controller and the signal conditioner, the optoelectronic assembly comprising:

a substrate subassembly, the substrate assembly comprising a substrate, a holder disposed on the substrate, an optoelectronic interface IC, at least one optical transmitter, at least one optical receiver, and a plurality of bonded fiber cables running through the optical cable, being connected to the other cable plug, and thereby forming an optical pathway; wherein side walls of the holder form a cavity;

a cable subassembly, the cable subassembly comprising a lens cover, a plurality of fiber cables bonded to the lens cover, and a fiber cover covering the fiber cables;

wherein the holder further comprises a plurality of alignment features, a bottom of the cavity comprises a plurality of recessed corners; a bottom side of the lens cover comprises a plurality of alignment pins and a plurality of support pins, the alignment pins are inserted into the alignment features.

17. The active optical cable of claim 16, wherein the electrical connector is a Thunderbolt connector.

18. The active optical cable of claim 16 further comprising two metal covers covering the electrical connector and the optoelectronic assembly respectively, and an outer sleeve enclosing the optoelectronic assembly.

19. The optoelectronic assembly of claim 1, wherein the support pins are disposed at the recessed corners of the cavity.

20. The optoelectronic assembly of claim 19, wherein a height of the support pins is configured to make the lens stop at a desired distance from the optoelectronic components.

21. The cable plug of claim 13, wherein the support pins are disposed at the recessed corners of the cavity.

22. The cable plug of claim 21, wherein a height of the support pins is configured to make the lens stop at a desired distance from the optoelectronic components.

23. The active optical cable of claim 16, wherein the support pins are disposed at the recessed corners of the cavity.

24. The active optical cable of claim 23, wherein a height of the support pins is configured to make the lens stop at a desired distance from the optoelectronic components.

* * * * *